Feb. 19, 1957 G. S. HAINES ET AL 2,782,099
PREPARATION OF BARIUM HYDROXIDE
Filed Feb. 15, 1954
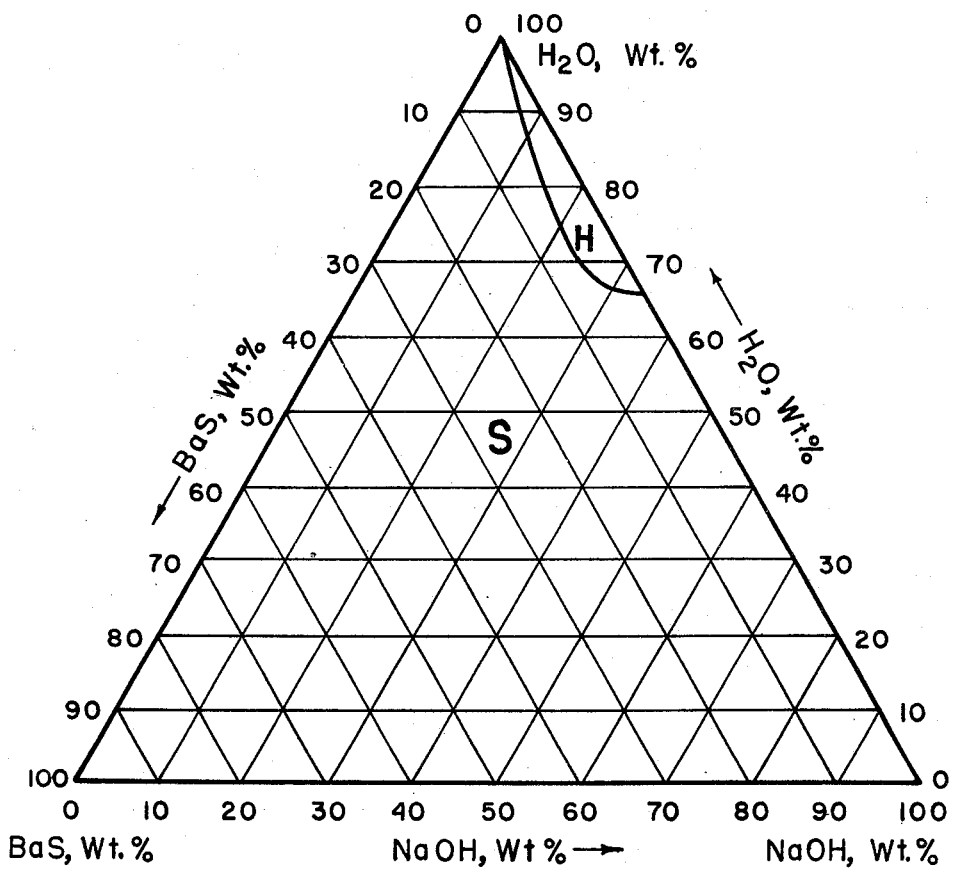
METATHESIS OF BARIUM SULFIDE
WITH SODIUM HYDROXIDE
INVENTORS
GEORGE S. HAINES
BY FRANK D. HEINDEL
CHESTER C. MEEKER
Glenn W. Parsons …

2,782,099
PREPARATION OF BARIUM HYDROXIDE

George S. Haines, St. Albans, and Frank D. Heindel and Chester C. Meeker, South Charleston, W. Va., assignors to Food Machinery and Chemical Corporation, New York, N. Y., a corporation of Delaware Application February 15, 1954, Serial No. 410,272

4 Claims. (Cl. 23—186)

This invention relates to a method for the preparation of pure crystalline barium hydroxide, and more particularly to a method involving the reaction between barium sulfide and sodium hydroxide.

The increasing use of barium hydroxide has created demands requiring the expansion of current production facilities of the industry. Difficulties have been encountered in the expansion of these facilities, particularly in the case of electric furnaces for the thermal decomposition of barium carbonate. Coincident with this development, an increase in the availability of crude barium sulfide (black ash) occurred, so it appeared desirable to reinvestigate the method of preparing barium hydroxide from this source of raw material.

The advantages of preparing barium hydroxide directly from barium sulfide by reaction with sodium hydroxide have long been recognized, but attempts to commercialize any such process have not been successful. A principal difficulty involved arises from the formation, in this process, of a sulfur-containing intermediate, basic barium sulfhydrate, $Ba(OH)(SH) \cdot 5H_2O$. This intermediate is quite stable, and carries through into the final product to a considerable extent, undesirably contaminating the barium hydroxide.

Shafor, in U. S. Patent No. 1,460,180, describes a process for converting barium carbonate or barium sulfide to barium hydroxide by reaction with sodium hydroxide, but his process actually involves a preliminary conversion of the carbonate or sulfide to barium chloride, by reaction with hydrochloric acid. He then reacts the intermediate barium chloride compound with sodium hydroxide, obtaining barium hydroxide as the final product. Therefore, this process is no different than various other such methods, involving the preparation of barium hydroxide from soluble barium salts, such as barium chloride and barium nitrate. Shafor's use of this additional step and indirect method implies that he was unable to obtain barium hydroxide directly from the barium sulfide by reaction with alkali.

Other prior art efforts to prepare barium hydroxide directly by the metathesis of barium sulfide and sodium hydroxide have been largely unsuccessful for various reasons, including the formation of the undesirable basic barium sulfhydrate intermediate, which reportedly could not be split into barium hydroxide by the action of alkali.

Another attempt at modifying the reaction between barium sulfide and sodium hydroxide is disclosed in U. S. Patent No. 1,812,250, involving the addition of ammonia to the reactancts. This disclosure recognizes the failure to prepare pure barium hydroxide by reaction of barium sulfide with sodium hydroxide, and that an impure product is always obtained, even through a large excess of sodium hydroxide is employed. In that patent, it is contended that the use of ammonia in the reaction operates to improve the purity of the product.

The prior art also recognizes the difficulty of purifying the crude barium hydroxide, obtained in such prior art efforts, by repeated recrystallization. This difficulty appears to be, at least in part, a function of the solubility characteristics of the sulfur-containing contaminant, which is not appreciably removed by recrystalliaztion procedures.

It is a principal object of this invention to overcome the foregoing and other disadvantages of the prior art.

Another important object of this invention is to provide a practical and direct method for the preparation of pure, crystalline barium hydroxide by the reaction of sodium hydroxide on barium sulfide.

These and other objects of the invention will be readily apparent to those skilled in the art from a consideration of the disclosure herein.

We have discovered that the foregoing and other disadvantages of the prior art processes have been completely overcome by our invention of a novel process involving the reaction between barium sulfide and sodium hydroxide under carefully prescribed conditions, as will be set forth hereinafter.

The accompanying drawing is a phase diagram of the system $BaS-NaOH-H_2O$, showing the reactant concentration area H within which pure, crystalline barium hydroxide may be obtained. We have found that the adherence to these conditions substantially completely avoids the production of impure barium hydroxide, and the product is much superior to that obtained in any of the prior art processes involving the use of barium sulfide.

Our investigations have shown, contrary to all of the teachings of the prior art, that pure, crystalline barium hydroxide can be obtained by the direct reaction of barium sulfide with sodium hydroxide. However, this desirable and unexpected result can be accomplished only by employing relatively dilute solutions of the reactants, in a limited range of concentrations. This unexpected result may possibly be explained on the solubility relationships, as between barium hydroxide and basic barium sulfhydrate, the latter tending to remain in solution under certain specified conditions. A small excess of sodium hydroxide appears to be preferable, but too large an excess of sodium hydroxide tends to produce an impure product, so that satisfactory results are obtained only by carefully and simultaneously controlling the concentrations of barium sulfide and sodium hydroxide. Under such conditions, a high quality barium hydroxide containing only a trace of sulfide can be prepared, in high yield.

Specifically, we have found the optimum conditions to involve the cooling of a solution, containing preferably about 5 wt. percent barium sulfide and 20 wt. percent sodium hydroxide in water, from a temperature of about 60° C. or higher down to a temperature where the solubility product of barium hydroxide octahydrate is exceeded, preferably about 25° C., whereby crystals of barium octahydrate, $Ba(OH)_2 \cdot 8H_2O$, are obtained which can readily be washed free of mother liquor. Other concentrations of barium sulfide and sodium hydroxide may be used, but our data indicate that the barium sulfide concentration in the reaction mixture must be less than 6%. The sodium hydroxide content must be several times the barium sulfide content, with the optimum ratio varying with the sulfide concentration, since these are interdependent variables.

However, all conditions involving the reaction of a less than 6% barium sulfide solution with a several fold quantity of sodium hydroxide do not produce pure barium hydroxide, as the respective concentrations must fall in the rather narrow field where barium hydrate precipitates, as illustrated in the accompanying phase diagram in the drawing area H. Outside this area sulfur contamination arises, as basic barium sulfahydrate, represented in the diagram as area S.

The diagram shows that the concentraiton of sodium hydroxide may range up to about 35%, and the barium sulfide concentration up to about 6%, though it is preferable to avoid the extremes of these ranges. Extremely dilute solutions should be avoided in the interests of minimizing the volume of liquids to be handled, in addition to the fact that the product itself would be excessively dissolved in highly dilute solutions. More practical and recommended lower limits for these ranges are about 3% and 10%, respectively.

The very marked effect on the purity of the product caused by slight changes in the concentrations of the reactants is shown by the following examples. In general, these solutions were prepared by leaching crude barium sulfide (black ash), filtering to remove insoluble material, adding filtrate to caustic soda solutions, and heating the solutions to about 60°–70° C.

Example 1

A solution containing 5.6% barium sulfide and 26.4% sodium hydroxide was cooled from 70° to 25° C., depositing crystals, which, after washing, contained sulfide equivalent to 19% barium sulfide and 4% sodium sulfide.

Example 2

In another run, following the procedure of Example 1, a solution containing 4.4% barium sulfide and 31.3% sodium hydroxide gave a washed product containing sulfide equivalent to 15% barium sulfide and 11% sodium sulfide.

Example 3

A solution containing 6.7% barium sulfide and 31.7% sodium hydroxide was cooled from 65° C. to 40° C., giving a product which contained more sulfide than hydroxide. The sulfide content could not be reduced by washing, indicating that barium hydroxide was not the primary product at these concentrations.

Example 4

A solution containing 5.4% barium sulfide and 12.9% sodium hydroxide was cooled from 60° C. to 25° C., giving a crop of crystals which, after washing, contained sulfide equivalent to 8.9% barium sulfide.

Example 5

A solution containing 4.3% barium sulfide and 20.4% sodium hydroxide was cooled from 60° C. to 25° C., with crystallization starting at about 50° C. The washed and dried product contained sulfide equivalent to 0.3% barium sulfide; and 99.7% barium octahydrate, in 88% yield.

Example 6

A solution containing 5.0% barium sulfide and 18.8% sodium hydroxide cooled from 65° C. to 25° C. gave a washed product containing 99.9% barium octahydrate and 0.1% barium sulfide, in 83% yield. These conditions probably represent the optimum from the standpoint of yield, purity and economy of equipment and materials.

Example 7

A solution containing 5.1% barium sulfide and 24.2% sodium hydroxide cooled to 25° C. gave a washed product containing 99.5% barium octahydrate and 0.5% barium sulfide.

Example 8

A solution containing 4.6% barium sulfide and 21.5% sodium hydroxide gave a washed product containing 99.7% barium octahydrate and 0.3% barium sulfide, in 85% yield.

From a consideration of the foregoing disclosure, it will be obvious to those skilled in the art that this invention is susceptible of slight variations producing other successful embodiments, but it is intended that all such fall within the scope of the appended claims.

That which is claimed as new is:

1. The process of preparing pure, crystalline barium hydroxide octahydrate by reacting barium sulfide with sodium hydroxide in the absence of ammonia, comprising: preparing a hot, dilute aqueous solution of barium sulfide and sodium hydroxide, wherein the concentrations of each of said compounds falls within the area H of the accompanying drawing; cooling said solution sufficiently to precipitate barium hydrate octahydrate crystals; and separating the crystals from the solution.

2. The process of claim 1 wherein the initial concentrations of barium sulfide and sodium hydroxide are about 5% and 20%, respectively.

3. The process of claim 1, wherein the hot solution is cooled to about 25° C.

4. The process of claim 2, wherein the hot solution is cooled to a temperature of about 25° C.

References Cited in the file of this patent

FOREIGN PATENTS

| | | |
|---|---|---|
| 1,096 | Great Britain | 1883 |
| 2,259 | Great Britain | 1883 |
| 7,136 | Great Britain | 1885 |
| 227,666 | Great Britain | Jan. 22, 1925 |
| 249,402 | Great Britain | Mar. 25, 1926 |